(12) United States Patent
Ogata et al.

(10) Patent No.: US 9,247,230 B2
(45) Date of Patent: Jan. 26, 2016

(54) IMAGE PROCESSING APPARATUS, IMAGE PROCESSING METHOD, AND PROGRAM

(75) Inventors: Masami Ogata, Kanagawa (JP); Takafumi Morifuji, Tokyo (JP); Suguru Ushiki, Tokyo (JP)

(73) Assignee: Sony Corporation, Tokyo (JP)

( * ) Notice: Subject to any disclaimer, the term of this patent is extended or adjusted under 35 U.S.C. 154(b) by 484 days.

(21) Appl. No.: 13/272,870

(22) Filed: Oct. 13, 2011

(65) Prior Publication Data

US 2012/0098828 A1     Apr. 26, 2012

(30) Foreign Application Priority Data

Oct. 20, 2010   (JP) ................. P2010-235385

(51) Int. Cl.
*H04N 13/00*     (2006.01)

(52) U.S. Cl.
CPC .... *H04N 13/0022* (2013.01); *H04N 2013/0074* (2013.01); *H04N 2013/0081* (2013.01)

(58) Field of Classification Search
CPC ............. H04N 13/0022; H04N 2013/0081; H04N 2013/0074
USPC ............................................. 348/51
See application file for complete search history.

(56) References Cited

U.S. PATENT DOCUMENTS

| 7,636,088 B2 * | 12/2009 | Nomura et al. .............. 345/419 |
| 7,889,196 B2 * | 2/2011 | Nomura et al. ................ 348/47 |
| 8,369,607 B2 * | 2/2013 | Mashitani et al. ............ 382/154 |
| 2005/0219239 A1 * | 10/2005 | Mashitani et al. ............ 345/419 |
| 2010/0238277 A1 | 9/2010 | Takahashi et al. |
| 2011/0102559 A1 * | 5/2011 | Nakane ........................ 348/54 |
| 2012/0249750 A1 * | 10/2012 | Izzat et al. .................... 348/47 |

FOREIGN PATENT DOCUMENTS

JP     2010-211036     9/2010

* cited by examiner

*Primary Examiner* — Behrooz Senfi
*Assistant Examiner* — Maria Vazquez Colon
(74) *Attorney, Agent, or Firm* — Paratus Law Group, PLLC

(57) ABSTRACT

An image processing apparatus includes a first display control unit that causes a display unit to display a first 3D image, a receiving unit that receives, from a user, a message indicating whether an amount of parallax of the first 3D image being displayed on the display unit is within an allowable range, a determining unit that determines an estimated allowable range on the basis of the message received by the receiving unit so that if the message indicates that the amount of parallax of the 3D image being displayed is not within the allowable range, the amount of parallax is not included in the estimated allowable range; and a second display control unit that causes the display unit to display a second 3D image on the basis of the estimated allowable range.

10 Claims, 13 Drawing Sheets

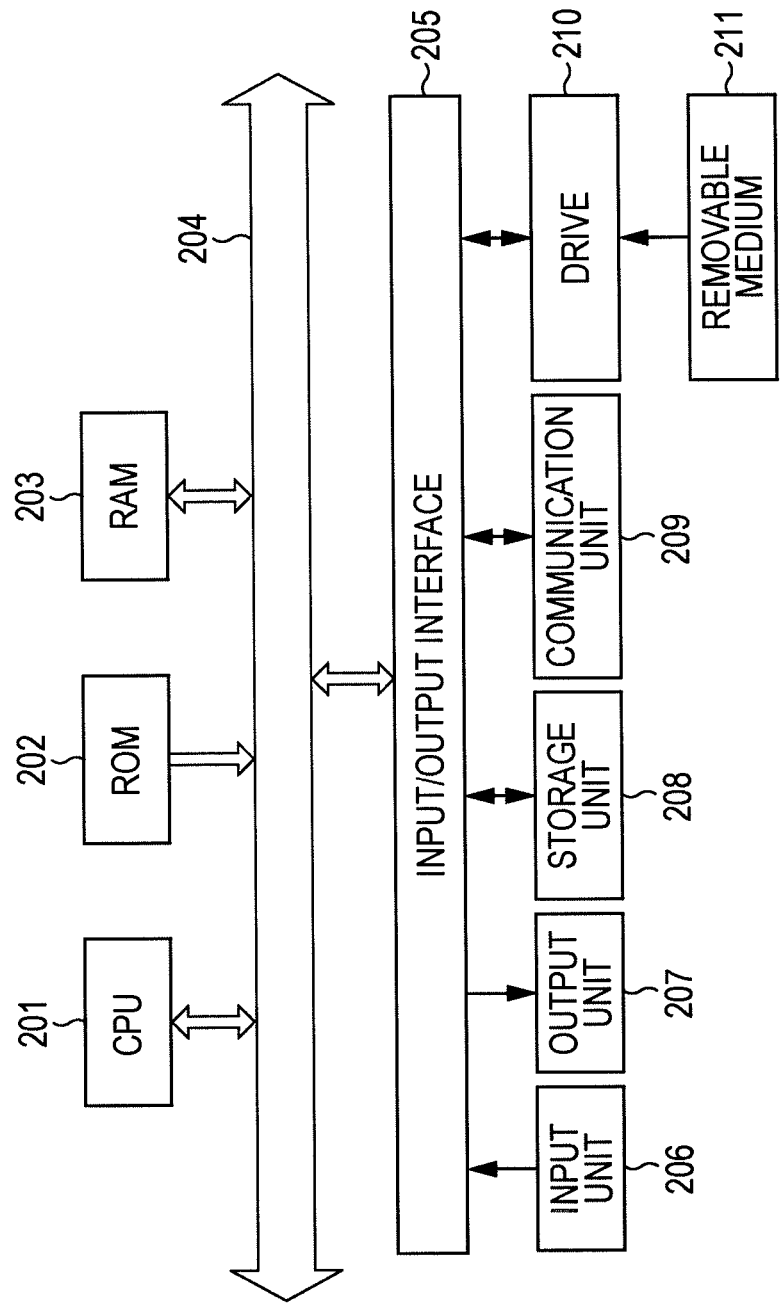

IMAGE PROCESSING APPARATUS, IMAGE PROCESSING METHOD, AND PROGRAM

BACKGROUND

The present disclosure relates to an image processing apparatus, an image processing method, and a program and, in particular, to an image processing apparatus, an image processing method, and a program capable of displaying 3D images suitable for individual users.

In recent years, 3D images have garnered a significant amount of attention and, thus, display apparatuses capable of displaying 3D images have been developed (refer to, for example, Japanese Unexamined Patent Application Publication No. 2010-211036). The amount of parallax of a 3D image displayed on such display apparatuses is set so as to be suitable for general users.

SUMMARY

However, a stereoscopic viewing ability for perceiving a 3D image and a preference for a display range in the depth direction vary among different individuals. Accordingly, a 3D image that is suitable for general users may cause fatigue for some users or may not satisfy some users since a sense of depth is not so strong for the users.

Accordingly, the present disclosure allows 3D images suitable for individual users to be displayed.

According to an embodiment of the present disclosure, an image processing apparatus includes a first display control unit that causes a display unit to display a first 3D image, a receiving unit that receives, from a user, a message indicating whether an amount of parallax of the first 3D image being displayed on the display unit is within an allowable range, a determining unit that determines an estimated allowable range on the basis of the message received by the receiving unit so that if the message indicates that the amount of parallax of the first 3D image being displayed is not within the allowable range, the amount of parallax is not included in the estimated allowable range, and a second display control unit that causes the display unit to display a second 3D image on the basis of the estimated allowable range.

According to another embodiment of the present disclosure, an image processing method and a program corresponding to the image processing apparatus according to the embodiment of the present disclosure are provided.

According to the embodiments of the present disclosure, a first 3D image is displayed on a display unit, a message indicating whether an amount of parallax of the first 3D image being displayed on the display unit is within an allowable range is received, an estimated allowable range is determined on the basis of the message so that if the message indicates that the amount of parallax of the first 3D image being displayed is not within the allowable range, the amount of parallax is not included in the estimated allowable range, and a second 3D image is displayed on the display unit on the basis of the estimated allowable range.

As described above, according to the embodiments of the present disclosure, 3D images suitable for individual users can be displayed.

BRIEF DESCRIPTION OF THE DRAWINGS

FIG. 14 illustrates an exemplary configuration of a computer according to an embodiment.

DETAILED DESCRIPTION OF EMBODIMENTS

Exemplary Embodiment

Figure 1:
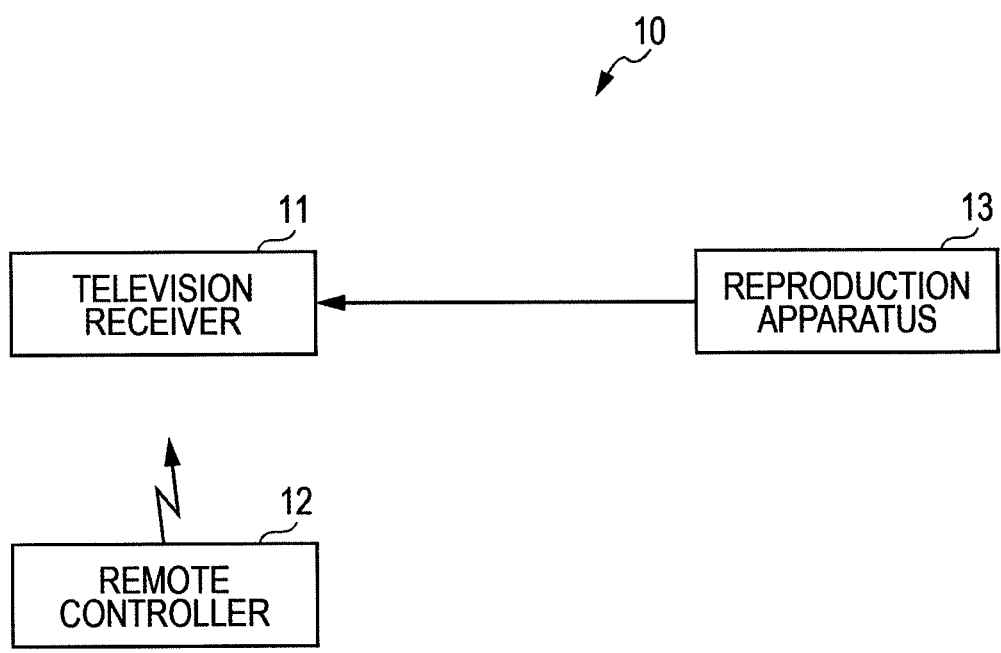
FIG. 1 is a block diagram of an exemplary configuration of a reproduction system according to an embodiment of the present disclosure.

Exemplary Configuration of Reproduction System According to Exemplary Embodiment FIG. 1 is a block diagram of an exemplary configuration of a reproduction system including a television receiver functioning as an image processing apparatus according to an embodiment of the present disclosure.

As illustrated in FIG. 1, a reproduction system 10 includes a television receiver 11, a remote controller 12, and a reproduction apparatus 13. The reproduction system 10 displays an image reproduced by the reproduction apparatus 13 on the television receiver 11.

More specifically, the television receiver 11 of the reproduction system 10 receives a light signal emitted from the remote controller 12 and performs a variety of processes in accordance with a command corresponding to the light signal. For example, in response to a command, the television receiver 11 receives an audio and video (AV) stream representing a 2D image of a predetermined channel program via an antenna (not shown) and outputs the 2D image and sound of the program.

In addition, in response to a command, the television receiver 11 displays a 3D test image (a first 3D image). At that time, a user operates, for example, the remote controller 12 and sends, to the television receiver 11, a message indicating whether the amount of parallax of the 3D test image being displayed is within an allowable range. In response to a command corresponding to the message, the television receiver 11 determines an estimated allowable range of the amount of parallax for the user so that if the message indicates that the amount of parallax of the 3D test image being displayed is not within the allowable range, the amount of parallax is not included in the estimated allowable range. The television receiver 11 holds a maximum value in the estimated range as a maximum amount of parallax. In addition, the television receiver 11 holds a minimum value in the estimated range as a minimum amount of parallax.

As used herein, the term "amount of parallax" refers to a shift amount between a left eye image and a right eye image. If the left eye image is shifted from the right eye image to the left, that is, if the 3D image is positioned behind the display screen in the depth direction, the amount of parallax is positive. In contrast, if the left eye image is shifted from the right eye image to the right, that is, if the 3D image is positioned in front of the display screen in the depth direction, the amount of parallax is negative.

In addition, in response to a command, the television receiver 11 receives an AV stream of a 3D image that is reproduced and transmitted by the reproduction apparatus 13. Thereafter, the television receiver 11 performs image processing on the 3D image corresponding to the AV stream (a second 3D image) on the basis of the minimum amount of parallax and the maximum amount of parallax and generates image data of the 3D image optimal for an individual user. The television receiver 11 outputs a 3D image corresponding to the image data subjected to the image processing and outputs the sound corresponding to the AV stream.

The remote controller 12 is operated by a user of the television receiver 11. The remote controller 12 generates a variety of commands in accordance with the operation performed by the user and emits a light signal corresponding to one of the commands.

In response to an instruction received from, for example, the user of the television receiver 11, the reproduction apparatus 13 reproduces an AV stream stored in a disk mounted therein or an internal hard disk and transmits the reproduced AV stream to the television receiver 11.

Exemplary Configuration of Television Receiver

Figure 2:
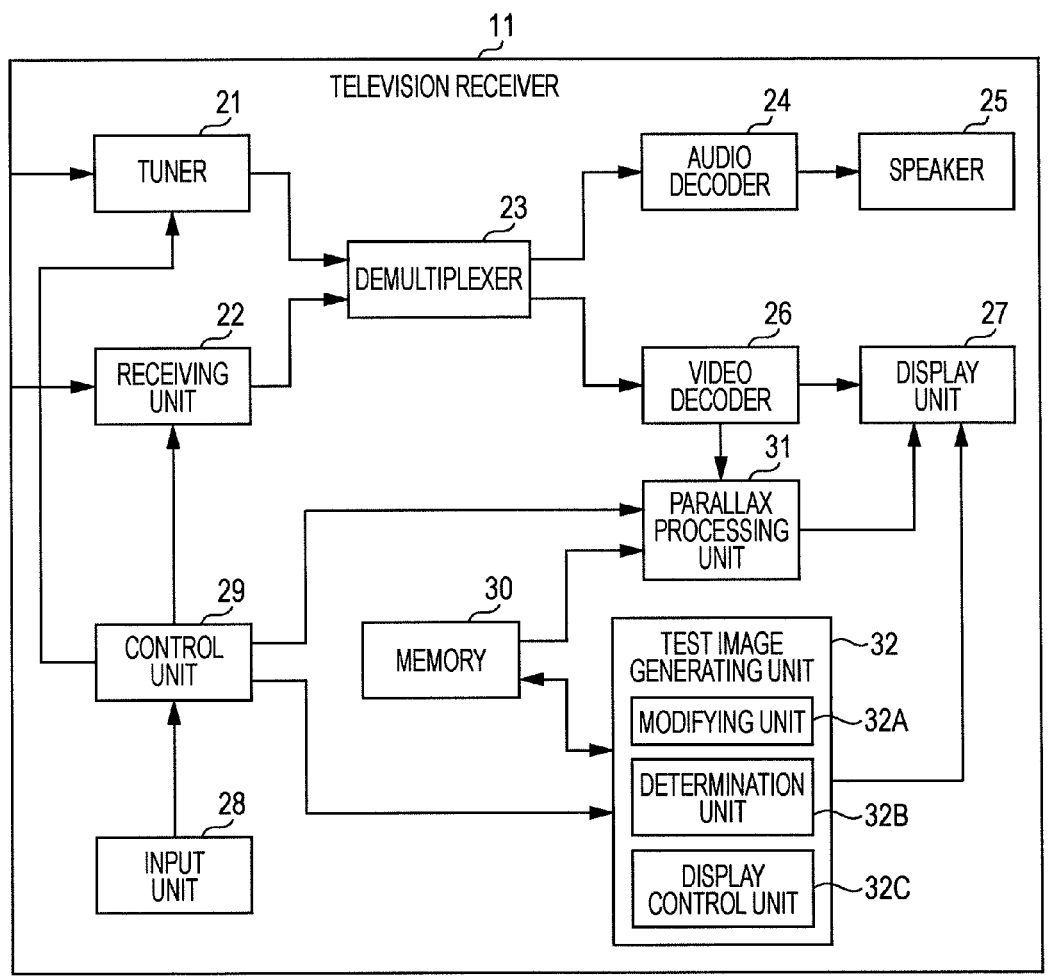
FIG. 2 is a block diagram illustrating an exemplary configuration of a television receiver illustrated in FIG. 1.

FIG. 2 is a block diagram illustrating an exemplary configuration of the television receiver 11 illustrated in FIG. 1.

As illustrated in FIG. 2, the television receiver 11 includes a tuner 21, a receiving unit 22, a demultiplexer 23, an audio decoder 24, a speaker 25, a video decoder 26, a display unit 27, an input unit 28, a control unit 29, a memory 30, a parallax processing unit 31, and a test image generating unit 32.

The tuner 21 of the television receiver 11 receives digital broadcast signals via an antenna (not shown). Upon receiving an instruction from the control unit 29, the tuner 21 extracts, from the received digital broadcast signals, a digital broadcast signal of a channel that the user instructs to select and demodulates the digital broadcast signal. The tuner 21 supplies a resultant AV stream to the demultiplexer 23.

The receiving unit 22 receives the AV stream for a 3D image transmitted from the reproduction apparatus 13 illustrated in FIG. 1 and supplies the AV stream to the demultiplexer 23 in response to an instruction received from the control unit 29.

The demultiplexer 23 separates the AV stream supplied from the tuner 21 or the receiving unit 22 into an image stream and an audio stream. The demultiplexer 23 supplies the audio stream to the audio decoder 24 and supplies the image stream to the video decoder 26.

The audio decoder 24 decodes the audio stream supplied from the demultiplexer 23 using a predetermined scheme and performs D/A conversion on the resultant audio data. The audio decoder 24 supplies an analog sound signal obtained through D/A conversion to a speaker 25. In this way, sound based on the sound signal is output.

The video decoder 26 decodes the image stream of the 2D image of a predetermined program supplied from the demultiplexer 23 using a predetermined scheme and supplies the resultant image data of the 2D image to the display unit 27.

The video decoder 26 decodes the image stream of the 3D image supplied from the demultiplexer 23 using a predetermined scheme and supplies the resultant image data to the parallax processing unit 31.

The display unit 27 uses the image data of the 2D image supplied from the video decoder 26 as image data for the left eye and image data for the right eye and alternately displays an image corresponding to the image data for the left eye and an image corresponding to the image data for the right eye. In this way, the user can view a 2D image of a predetermined program.

In addition, the display unit 27 alternately displays an image corresponding to the image data for the left eye and an image corresponding to the image data for the right eye of a 3D image data supplied from the parallax processing unit 31 or a 3D test image data supplied from the test image generating unit 32. At that time, the user wears eyeglasses that open a shutter for the left eye when a left eye image is displayed and open a shutter for the right eye when a right eye image is displayed. Then, the user watches the images. In this way, the user can view a 3D image.

The input unit 28 includes a light receiving unit that receives light emitted from the remote controller 12 illustrated in FIG. 1 and operation buttons. The input unit 28 receives a light signal emitted from the remote controller 12 and supplies a command corresponding to the received light signal to the control unit 29. In addition, the input unit 28 supplies, to the control unit 29, an operation signal representing an operation performed on the operation buttons by the user.

The control unit 29 instructs the tuner 21 to select a channel determined on the basis of the command or the operation signal supplied from the input unit 28 and instructs the receiving unit 22 to output an AV stream. In addition, in response to a command or an operation signal, the control unit 29 instructs the parallax processing unit 31 to start parallax processing in which an image process is performed on the basis of the minimum amount of parallax and the maximum amount of parallax. Furthermore, in response to a command or an operation signal, the control unit 29 instructs the test image generating unit 32 to start a parallax setting process in which the minimum amount of parallax and the maximum amount of parallax are set and sends, to the test image generating unit 32, a message indicating whether the amount of parallax of a 3D test image being displayed is within the allowable range.

The memory 30 is formed from, for example, a flash memory. The memory 30 holds the minimum amount of parallax and the maximum amount of parallax supplied from the test image generating unit 32. In addition, the memory 30 prestores predetermined 3D image data serving as image data of a 3D test image (hereinafter referred to as "test image data").

The parallax processing unit 31 performs parallax processing in response to an instruction output from the control unit 29. More specifically, the parallax processing unit 31 reads the minimum amount of parallax and the maximum amount of parallax from the memory 30. The parallax processing unit 31 performs image processing on the image data of a 3D image supplied from the video decoder 26 using the minimum amount of parallax and the maximum amount of parallax and generates image data of a 3D image optimal for an individual user. The parallax processing unit 31 supplies, to the display unit 27, the image data of the 3D image subjected to the image processing.

The test image generating unit 32 includes a modifying unit 32A, a determination unit 32B, and a display control unit 32C. In response to an instruction output from the control unit 29, the test image generating unit 32 performs a parallax setting process. More specifically, the modifying unit 32A (a modifying unit) of the test image generating unit 32 modifies the amount of parallax of the test image data stored in the memory 30 on the basis of a message that is received from the control unit 29 and that indicates whether the amount of parallax of the 3D test image being displayed is within the allowable range. For example, in order to modify the amount of parallax of the test image data, each of the images corresponding to the image data for the right eye and the image data for the left eye of the test image data can be shifted in the horizontal direction.

Using a message that is received from the control unit 29 and that indicates whether the amount of parallax of the 3D test image being displayed is within the allowable range, the determination unit 32B (a determination unit) determines the estimated allowable range of the amount of parallax for the user so that if the message indicates that the amount of parallax of the 3D test image being displayed is not within the allowable range, the amount of parallax is not included in the estimated allowable range. Thereafter, the determination unit 32B supplies, to the memory 30, the maximum value of the estimated range as the maximum amount of parallax and supplies, to the memory 30, the minimum value of the estimated range as the minimum amount of parallax.

The display control unit 32C reads the test image data from the memory 30 and supplies the test image data to the display unit 27. In addition, the display control unit 32C supplies the test image data having the amount of parallax modified by the modifying unit 32A to the display unit 27.

Example of 3D Test Image

Figure 3:
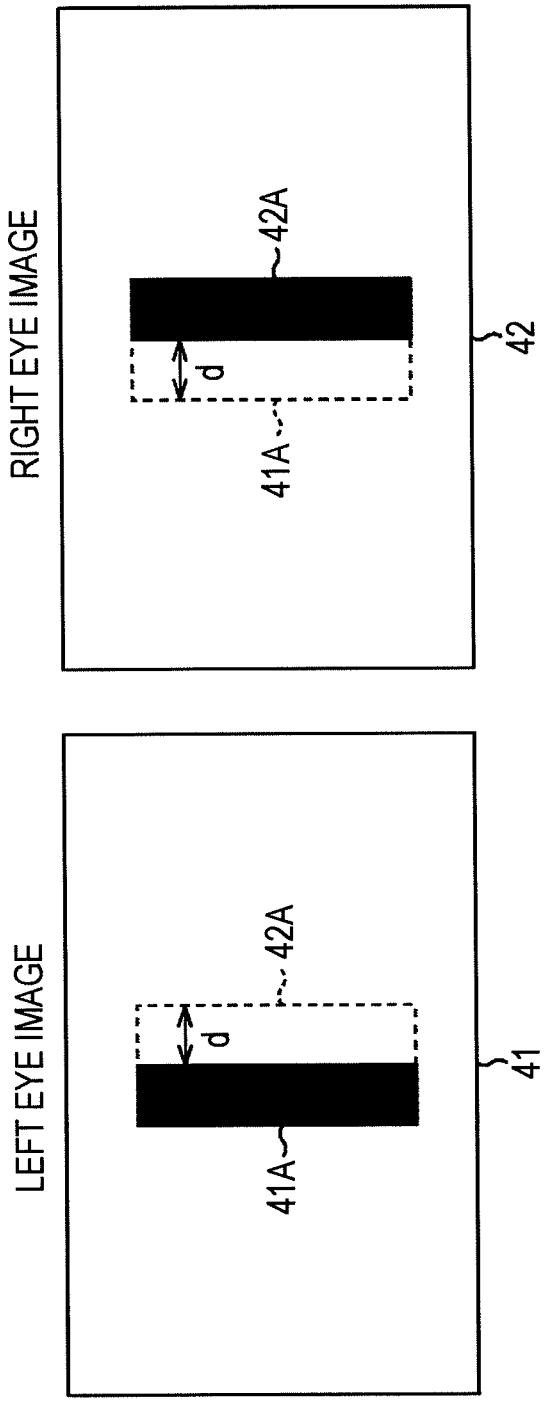
FIG. 3 illustrates an example of a 3D test image.

FIG. 3 illustrates an example of a 3D test image corresponding to the test image data stored in the memory 30 illustrated in FIG. 2.

As illustrated in FIG. 3, the 3D test image includes a left eye image 41 and a right eye image 42. In the example illustrated in FIG. 3, the left eye image 41 contains a rectangular test pattern 41A. The right eye image 42 contains a pattern 42A that is the same as the pattern 41A in the left eye image 41 at a position distant from a position corresponding to the position of the rectangular test pattern 41A of the left eye image 41 by a distance d. That is, the amount of parallax of the 3D test image illustrated in FIG. 3 is +d.

The modifying unit 32A illustrated in FIG. 2 modifies the amount of parallax of +d on the basis of the message that is received from the control unit 29 and that indicates whether the amount of parallax of the 3D test image being displayed is within the allowable range.

Note that in the example illustrated in FIG. 3, the 3D test image includes only one rectangular test pattern. However, the number of test patterns and the shape of the test pattern are not limited thereto.

Description of Parallax Setting Process

Figure 4:
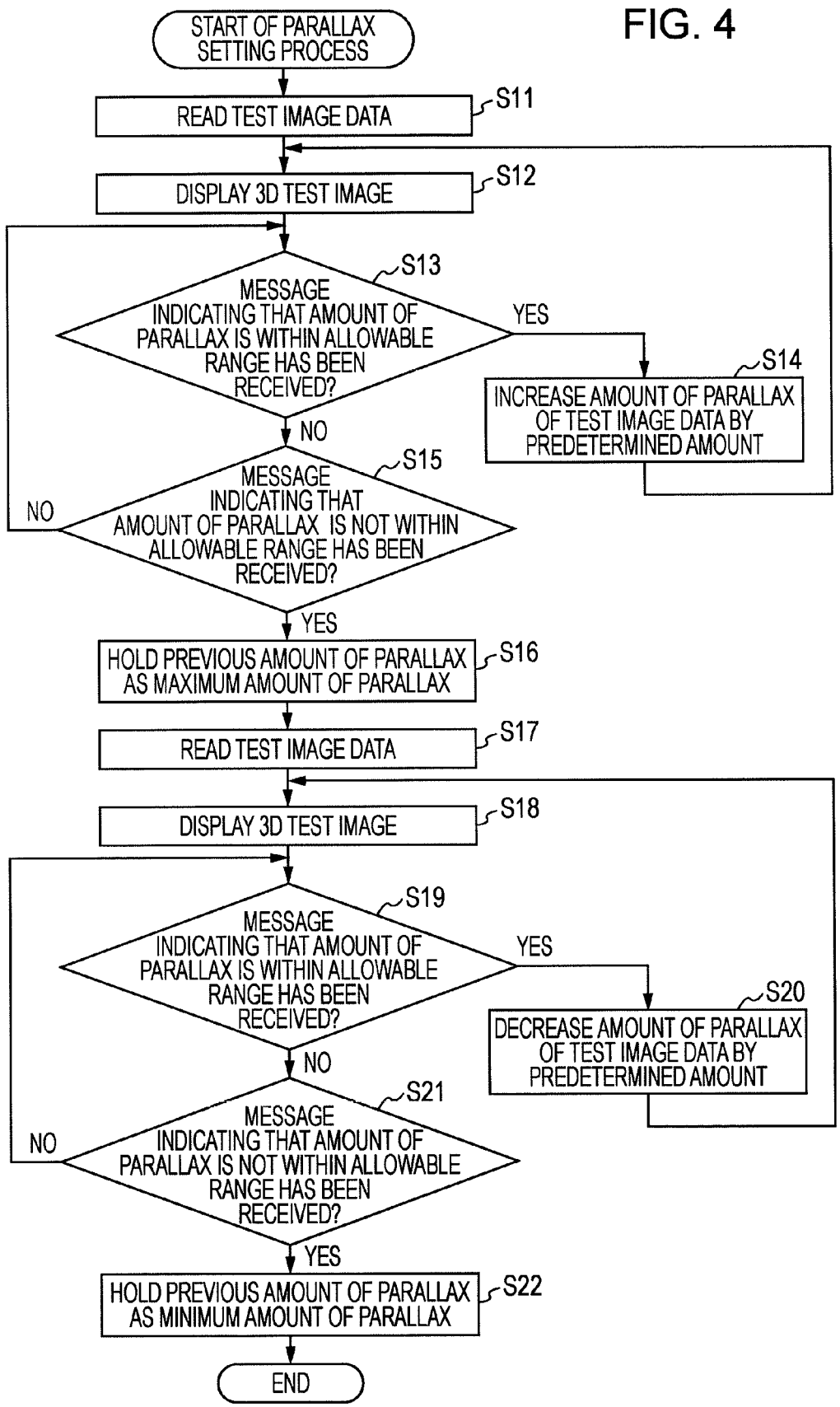
FIG. 4 is a flowchart illustrating a parallax setting process.

FIG. 4 is a flowchart illustrating the parallax setting process performed by the television receiver 11 illustrated in FIG. 1. The parallax setting process is started when the user operates, for example, the remote controller 12 and instructs the television receiver 11 to set the maximum amount of parallax and the minimum amount of parallax.

As illustrated in FIG. 4, in step S11, upon receiving an instruction to start the parallax setting process from the control unit 29, the display control unit 32C of the television receiver 11 reads test image data from the memory 30.

Note that the instruction to start the parallax setting process is sent from the control unit 29 in the following manner. For example, in response to a user operation to set the maximum amount of parallax and the minimum amount of parallax, the remote controller 12 generates a command for instructing starting of the parallax setting process (hereinafter referred to as a "parallax setting process start command"). Thereafter, the remote controller 12 emits a light signal corresponding to the generated parallax setting process start command. Upon receiving the light signal, the input unit 28 supplies a parallax setting process start command corresponding to the light signal to the control unit 29. The control unit 29 instructs the test image generating unit 32 to start the parallax setting process in response to the parallax setting process start command.

In step S12, the display control unit 32C (a first display control unit) supplies the test image data to the display unit 27, which displays a 3D test image. At that time, the user views the 3D test image being displayed on the display unit 27 and determines whether the 3D image is perceived and the 3D image makes their eyes tired. Thereafter, when, for example, the user can perceive the 3D image and if the 3D image does not make their eyes tired, the user operates, for example, the remote controller 12 and sends a message indicating that the amount of parallax of the 3D test image being displayed is within the allowable range. However, if, for example, it is difficult for the user to perceive the 3D image or if the 3D image makes their eyes tired, the user operates, for example, the remote controller 12 and sends a message indicating that the amount of parallax of the 3D test image being displayed is not within the allowable range. Upon receiving a command or an operation signal in accordance with such an operation, the input unit 28 (a receiving unit) supplies the command or operation signal to the control unit 29. The control unit 29 sends, to the test image generating unit 32, a message indicating whether the amount of parallax of the 3D test image being displayed is within the allowable range on the basis of the command or the operation signal.

In step S13, the modifying unit 32A determines whether a message indicating that the amount of parallax of the 3D test image being displayed is within the allowable range has been received from the control unit 29. If, in step S13, it is determined that a message indicating that the amount of parallax of the 3D test image being displayed is within the allowable range has been received, the processing proceeds to step S14.

In step S14, the modifying unit 32A increases the amount of parallax of the test image data by a predetermined amount. Thereafter, the processing returns to step S12, and the processes in steps S12 to S14 are repeated until a message indicating that the amount of parallax of the 3D test image being displayed is within the allowable range is not received. That is, the amount of parallax of the 3D test image being displayed on the display unit 27 is increased by the predetermined amount in a stepwise manner until the user stops performing an operation to send a message indicating that the amount of parallax of the 3D test image being displayed is within the allowable range.

However, if, in step S13, it is determined that a message indicating that the amount of parallax of the 3D test image being displayed is within the allowable range has not been received from the control unit 29, the processing proceeds to step S15. In step S15, the determination unit 32B determines whether it has received, from the control unit 29, a message indicating that the amount of parallax of the 3D test image being displayed is not within the allowable range.

If, in step S15, it is determined that a message indicating that the amount of parallax of the 3D test image being displayed is outside the allowable range has yet not been received, the processing returns to step S13. Thereafter, the processes in steps S13 to S15 are repeated until a message indicating that the amount of parallax of the 3D test image being displayed is within the allowable range or a message indicating that the amount of parallax of the 3D test image being displayed is not within the allowable range is received.

However, if, in step S15, it is determined that a message indicating that the amount of parallax of the 3D test image being displayed is outside the allowable range has been received, the processing returns to step S16. In step S16, the determination unit 32B selects the previous amount of parallax of the test image data, that is, a value that is smaller than the current amount of parallax of the test image data by the predetermined amount, as the maximum value of an estimated allowable range and supplies the selected value to the memory 30. The memory 30 stores the value as the maximum amount of parallax.

In step S17, the display control unit 32C reads the test image data from the memory 30 again. In step S18, the display control unit 32C supplies the test image data to the display unit 27. Thus, the display unit 27 displays the 3D test image. At that time, as in step S12, the user operates, for example, the remote controller 12 and sends a message indicating whether the amount of parallax of the 3D test image being displayed is within the allowable range. As a result of the operation, the control unit 29 sends, to the test image generating unit 32, a message indicating whether the amount of parallax of the 3D test image being displayed is within the allowable range.

In step S19, the modifying unit 32A determines whether it has received, from the control unit 29, a message indicating that the amount of parallax of the 3D test image being displayed is within the allowable range. If, in step S19, the modifying unit 32A determines that it has received a message indicating that the amount of parallax of the 3D test image being displayed is within the allowable range, the processing proceeds to step S20.

In step S20, the modifying unit 32A decreases the amount of parallax of the test image data by a predetermined amount. Thereafter, the processing returns to step S18, and the processes in steps S18 to S20 are repeated until a message indicating that the amount of parallax of the 3D test image being displayed is within the allowable range is not received. That is, the amount of parallax of the 3D test image being displayed on the display unit 27 is decreased by the predetermined amount in a stepwise manner until the user stops performing an operation to send a message indicating that the amount of parallax of the 3D test image being displayed is within the allowable range.

However, if, in step S19, it is determined that a message indicating that the amount of parallax of the 3D test image being displayed is within the allowable range has yet not been received from the control unit 29, the processing proceeds to step S21. In step S21, the determination unit 32B determines whether it has received, from the control unit 29, a message indicating that the amount of parallax of the 3D test image being displayed is not within the allowable range.

If, in step S21, it is determined that a message indicating that the amount of parallax of the 3D test image being displayed is outside the allowable range has yet not been received, the processing returns to step S19. Thereafter, the processes in steps S19 and S21 are repeated until a message indicating that the amount of parallax of the 3D test image being displayed is within the allowable range or a message indicating that the amount of parallax of the 3D test image being displayed is not within the allowable range is received.

However, if, in step S21, it is determined that a message indicating that the amount of parallax of the 3D test image being displayed is outside the allowable range has been received, the processing returns to step S22. In step S22, the determination unit 32B selects the previous amount of parallax of the test image data, that is, a value that is greater than the current amount of parallax of the test image data by the predetermined amount, as the minimum value of an estimated allowable range and supplies the selected value to the memory 30. The memory 30 stores the value as the minimum amount of parallax.

While the present embodiment has been described with reference to the estimated allowable range determined using a prestored 3D test image and a 3D test image having a modified amount of parallax, the estimated allowable range may be determined using only the prestored 3D test image.

In addition, while the present embodiment has been described with reference to the amount of parallax of the 3D test image increased or decreased by a predetermined amount in a stepwise manner, the amount of parallax of the 3D test image may be modified at random.

Example of Detailed Configuration of Parallax Processing Unit

Figure 5:
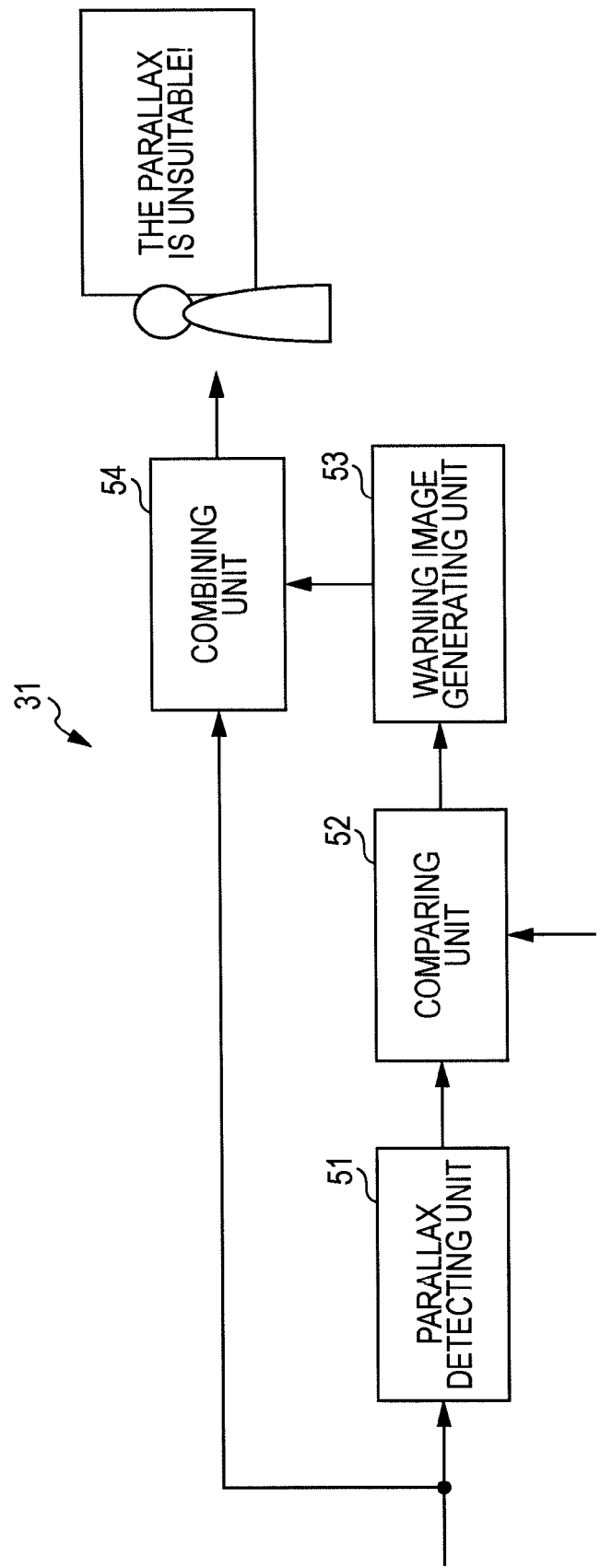
FIG. 5 illustrates an example of the configuration of a parallax processing unit illustrated in FIG. 2 in detail.

FIG. 5 illustrates an example of the configuration of the parallax processing unit 31 illustrated in FIG. 2 in detail.

As illustrated in FIG. 5, the parallax processing unit 31 includes a parallax detecting unit 51, a comparing unit 52, a warning image generating unit 53, and a combining unit 54. If the amount of parallax of the image data of the 3D test image supplied from the video decoder 26 is not within the estimated allowable range, the parallax processing unit 31 illustrated in FIG. 5 overlays a warning image on the 3D image corresponding to the image data, and the overlaid 3D image is displayed.

More specifically, the parallax detecting unit 51 of the parallax processing unit 31 performs block matching on the image data of a 3D image supplied from the video decoder 26 illustrated in FIG. 2 and detects the amount of parallax for each of the pixels of the image data. Note that in this example, the amount of parallax is detected for each of the pixels. However, a unit from which the amount of parallax is detected is not limited to a pixel. For example, the amount of parallax may be detected for a plurality of pixels. The parallax detecting unit 51 supplies the amount of parallax detected for each of the pixels to the comparing unit 52.

The comparing unit 52 reads the minimum amount of parallax and the maximum amount of parallax from the memory 30. The comparing unit 52 compares the amount of parallax of each of the pixels supplied from the parallax detecting unit 51 with each of the minimum amount of parallax and the maximum amount of parallax and determines whether a pixel having an amount of parallax that is not within the estimated allowable range is present. If it is determined that a pixel having an amount of parallax that is not within the estimated allowable range is present, the comparing unit 52 instructs the warning image generating unit 53 to generate a warning image.

Note that in this example, if it is determined that a pixel having an amount of parallax that is not within the estimated allowable range is present, a warning image is generated. However, a warning image may be generated if it is determined that the amount of parallax of a predetermined pixel is not within the estimated allowable range. Examples of the amount of parallax of a predetermined pixel include the amount of parallax of an area including a primary subject and the amount of parallax having a maximum frequency in the histogram of the amounts of parallax of all the pixels.

Upon receiving the instruction from the comparing unit 52, the warning image generating unit 53 generates image data of a warning image indicating that the amount of parallax is not suitable for the user and supplies the generated image data to the combining unit 54. Note that image data of the warning message may be prestored in, for example, the memory 30 (refer to FIG. 2).

If the image data of the warning image has not been supplied from the warning image generating unit 53, the combining unit 54 (a second display control unit) directly supplies, to the display unit 27, the image data of a 3D image supplied from the video decoder 26. Thus, only the 3D image is displayed. In contrast, if the image data of the warning image has been supplied from the warning image generating unit 53, the combining unit 54 combines the image data of the warning image with the image data of a 3D image and supplies the combined image to the display unit 27. Thus, the 3D image overlapped with the warning image is displayed. In this way, for example, as illustrated in FIG. 5, a 3D image overlapped with a warning image of the text "The parallax is unsuitable!" is displayed on the display unit 27.

Note that the warning image displayed on the display unit 27 may disappear in response to a user instruction.

Description of First Parallax Processing

Figure 6:
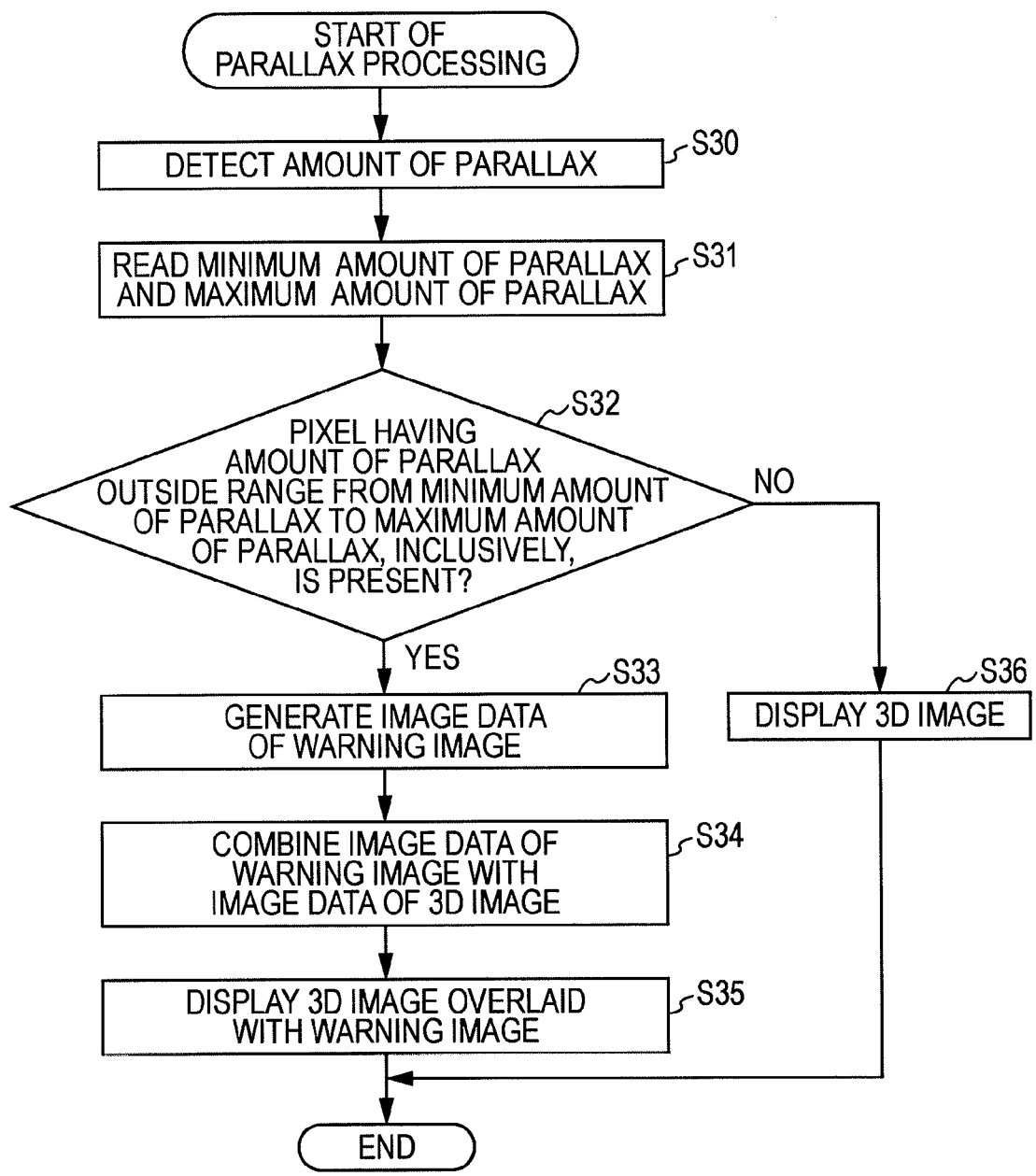
FIG. 6 is a flowchart illustrating the parallax processing performed by the parallax processing unit illustrated in FIG. 5.

FIG. 6 is a flowchart illustrating the parallax processing performed by the parallax processing unit 31 illustrated in FIG. 5. The parallax processing starts when, for example, the image data of a 3D image on a frame-by-frame basis is input from the video decoder 26 illustrated in FIG. 2 to the parallax processing unit 31.

As illustrated in FIG. 6, in step S30, the parallax detecting unit 51 (refer to FIG. 5) of the parallax processing unit 31 performs block matching on the image data of a 3D image supplied from the video decoder 26 illustrated in FIG. 2 and detects the amount of parallax of each of the pixels of the image data. The parallax detecting unit 51 supplies the detected amount of parallax of each of the pixels to the comparing unit 52.

In step S31, the comparing unit 52 reads the minimum amount of parallax and the maximum amount of parallax from the memory 30 illustrated in FIG. 2. In step S32, the comparing unit 52 determines, on the basis of the amount of parallax of each of the pixels supplied from the parallax detecting unit 51, the minimum amount of parallax, and the maximum amount of parallax, whether a pixel having an amount of parallax that is not within the range from the minimum amount of parallax to the maximum amount of parallax, inclusively, is present.

If, in step S32, it is determined that a pixel having an amount of parallax that is not within the range from the minimum amount of parallax to the maximum amount of parallax, inclusively, that is, a pixel having an amount of parallax that is not within the estimated allowable range is present, the comparing unit 52 instructs the warning image generating unit 53 to generate a warning image. Thereafter, the processing proceeds to step S33.

In step S33, upon receiving the instruction supplied from the comparing unit 52, the warning image generating unit 53 generates the image data of a warning image indicating that the amount of parallax is unsuitable for the user and supplies the generated image data to the combining unit 54.

In step S34, the combining unit 54 combines the image data of the warning image supplied from the warning image generating unit 53 with the image data of a 3D image supplied from the video decoder 26 (refer to FIG. 2). In step S35, the combining unit 54 supplies the combined image data to the display unit 27, which displays the 3D image overlaid with the warning image.

However, if, in step S32, it is determined that a pixel having an amount of parallax outside the range from the minimum amount of parallax to the maximum amount of parallax, inclusively, is not present, that is, if the amounts of parallax of all of the pixels are within the estimated allowable range, the processing proceeds to step S36. In step S36, the combining unit 54 directly supplies, to the display unit 27, the image data of a 3D image supplied from the video decoder 26. Thus, only the 3D image is displayed on the display unit 27. Thereafter, the processing is completed.

As described above, the parallax processing unit 31 illustrated in FIG. 5 overlays a warning image on a 3D image on the basis of the estimated allowable range of the amount of parallax for the user and instructs the display unit 27 to display the overlaid image. Accordingly, a 3D image suitable for an individual user can be displayed.

Another Example of Detailed Configuration of Parallax Processing Unit

Figure 7:
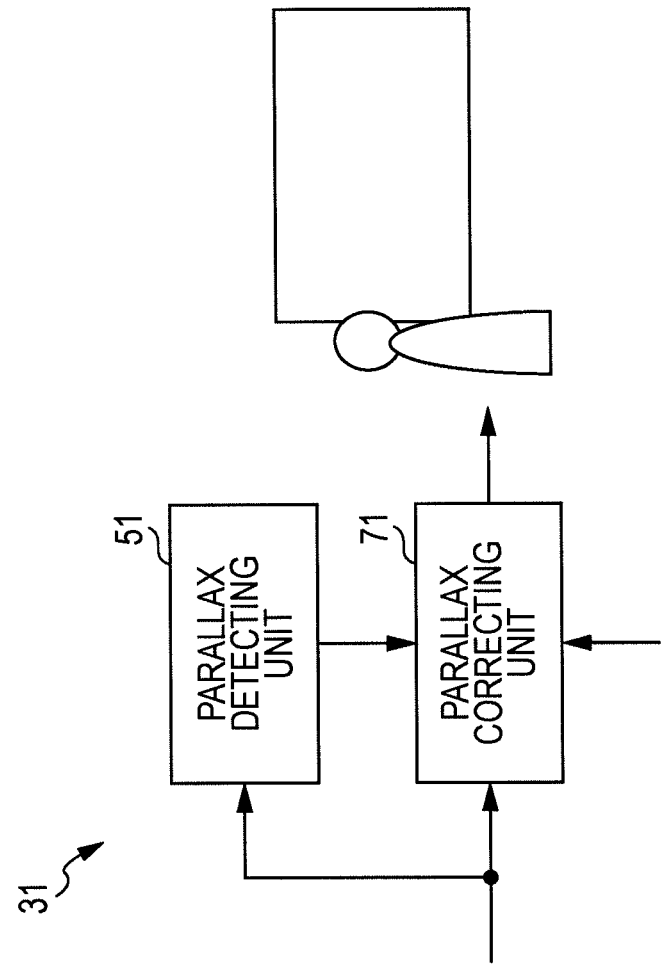
FIG. 7 illustrates another example of the configuration of the parallax processing unit illustrated in FIG. 2 in detail.

FIG. 7 illustrates another example of the configuration of the parallax processing unit 31 illustrated in FIG. 2 in detail.

The parallax processing unit 31 illustrated in FIG. 7 includes a parallax detecting unit 51 and a parallax correcting unit 71. Note that the same components as those illustrated and described in relation to FIG. 5 are designated by the same reference numerals, and detailed descriptions thereof are not included hereinafter.

If the amount of parallax of the image data of a 3D image supplied from the video decoder 26 illustrated in FIG. 2 is not within the estimated allowable range, the parallax processing unit 31 illustrated in FIG. 7 corrects the amount of parallax of the image data so that the amount of parallax is within the estimated allowable range.

More specifically, the parallax correcting unit 71 of the parallax processing unit 31 reads the minimum amount of parallax and the maximum amount of parallax from the memory 30. The parallax correcting unit 71 determines, on the basis of the amount of parallax of each of the pixels of the image data of a 3D image detected by the parallax detecting unit 51, the minimum amount of parallax, and the maximum amount of parallax, whether a pixel having an amount of parallax that is not within the estimated allowable range is present. If it is determined that a pixel having an amount of parallax that is not within the estimated allowable range is present, the parallax correcting unit 71 (a parallax amount correcting unit) determines a parameter used for correcting the amount of parallax so that after correction, the amounts of parallax of all of the pixels are within the estimated allowable range.

Thereafter, the parallax correcting unit 71 corrects the amount of parallax of the image data of the 3D image supplied from the video decoder 26 on the basis of the parameter. The parallax correcting unit 71 supplies the corrected image data of the 3D image to the display unit 27 (refer to FIG. 2). Thereafter, the parallax correcting unit 71 instructs the display unit 27 to display the 3D image having the corrected amount of parallax. In this way, the 3D image in which all of the pixels have the amounts of parallax that are within the estimated allowable range is displayed on the display unit 27.

Example of Detailed Configuration of Parallax Correcting Unit

Figure 8:
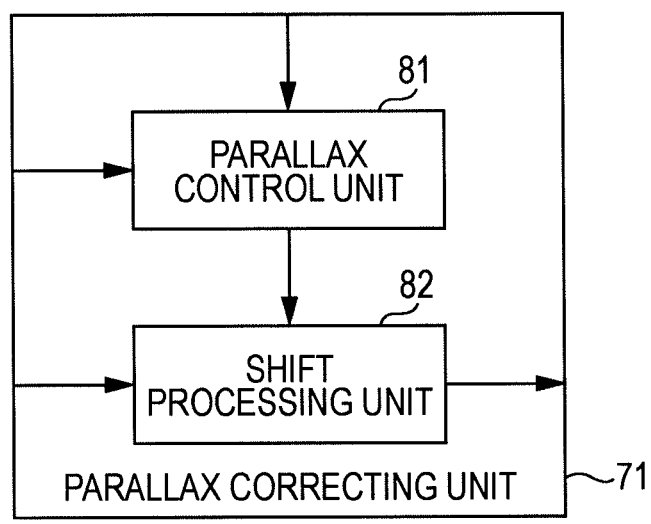
FIG. 8 is a block diagram of an example of the configuration of a parallax correcting unit illustrated in FIG. 7.

FIG. 8 is a block diagram of an example of the configuration of the parallax correcting unit 71 illustrated in FIG. 7.

As illustrated in FIG. 8, the parallax correcting unit 71 includes a parallax control unit 81 and a shift processing unit 82. The parallax correcting unit 71 illustrated in FIG. 8 corrects the amount of parallax of a 3D image by shifting the amount of parallax of the 3D image so that the amounts of parallax of all of the pixels of the 3D image are within the estimated allowable range.

More specifically, the parallax control unit 81 of the parallax correcting unit 71 reads the minimum amount of parallax and the maximum amount of parallax from the memory 30 illustrated in FIG. 2. The parallax control unit 81 determines, on the basis of the amount of parallax of each of the pixels of the image data of a 3D image detected by the parallax detecting unit 51 illustrated in FIG. 7, the minimum amount of parallax, and the maximum amount of parallax, whether a pixel having an amount of parallax that is not within the estimated allowable range is present. If it is determined that a pixel having an amount of parallax that is not within the estimated allowable range is present, the parallax control unit 81 determines, as a parameter, a shift amount of the amount of parallax necessary for the amounts of parallax of all of the pixels to be within the estimated allowable range. The parallax control unit 81 supplies the determined shift amount to the shift processing unit 82.

By using the shift amount supplied from the parallax control unit 81, the shift processing unit 82 shifts each of the left eye image and the right eye image included in a 3D image corresponding to the image data of the 3D image supplied from the video decoder 26 by half the shift amount in the horizontal direction. Thereafter, the shift processing unit 82 supplies, to the display unit 27 (refer to FIG. 2), the image data of the 3D image having an amount of parallax shifted by the shift amount and corrected. Thus, the 3D image having the corrected amount of parallax is displayed on the display unit 27.

Note that if a shift amount is not supplied from the parallax control unit 81, the shift processing unit 82 directly supplies the image data of the 3D image supplied from the video decoder 26 to the display unit 27 and instructs the display unit 27 to display the 3D image.

Description of Second Parallax Processing

Figure 9:
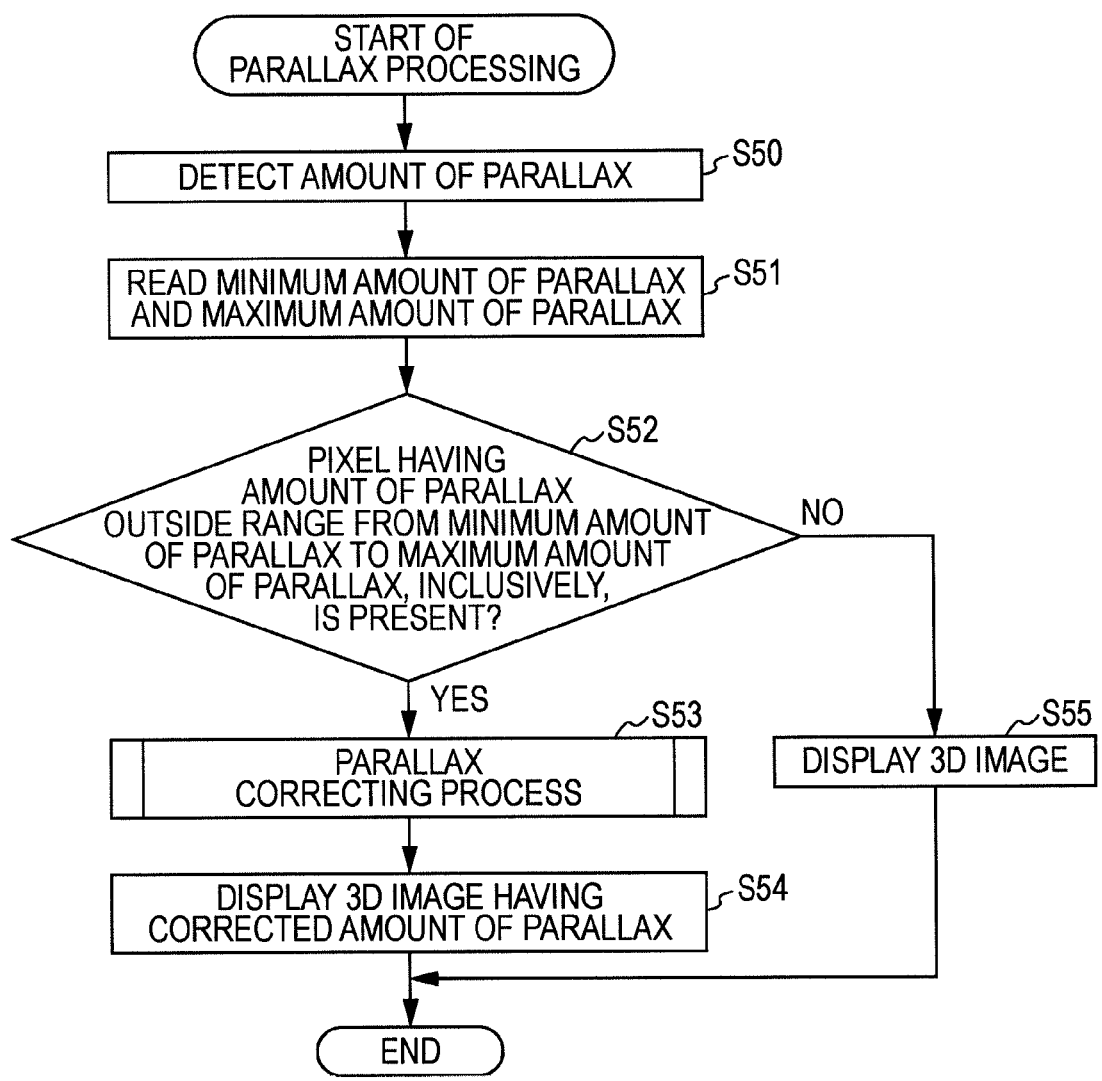
FIG. 9 is a flowchart illustrating the parallax processing performed by the parallax processing unit illustrated in FIG. 7.

FIG. 9 is a flowchart illustrating the parallax processing performed by the parallax processing unit 31 illustrated in FIG. 7 including the parallax correcting unit 71 illustrated in FIG. 8. The parallax processing starts when, for example, the image data of a 3D image on a frame-by-frame basis is input from the video decoder 26 illustrated in FIG. 2 to the parallax processing unit 31.

As illustrated in FIG. 9, in step S50, the parallax detecting unit 51 (refer to FIG. 7) of the parallax processing unit 31 performs block matching on the image data of a 3D image supplied from the video decoder 26 illustrated in FIG. 2 and detects the amount of parallax of each of the pixels of the image data. The parallax detecting unit 51 supplies the detected amount of parallax of each of the pixels to the parallax correcting unit 71.

In step S51, the parallax control unit 81 (refer to FIG. 8) of the parallax correcting unit 71 reads the minimum amount of parallax and the maximum amount of parallax from the memory 30 illustrated in FIG. 2.

In step S52, the parallax control unit 81 determines, on the basis of the amount of parallax of each of the pixels supplied from the parallax detecting unit 51, the minimum amount of parallax, and the maximum amount of parallax, whether a pixel having an amount of parallax that is not within the range from the minimum amount of parallax to the maximum amount of parallax, inclusively, is present.

If, in step S52, it is determined that a pixel having an amount of parallax that is not within the range from the minimum amount of parallax to the maximum amount of parallax, inclusively, that is, an amount of parallax that is not within the estimated allowable range is present, the parallax correcting unit 71, in step S53, performs a parallax correcting process in which the parallax of the image data of the 3D image is corrected. The parallax correcting process is described in more detail below with reference to FIG. 10.

In step S54, the shift processing unit 82 supplies, to the display unit 27 (refer to FIG. 2), the image data of the 3D image having an amount of parallax corrected through the parallax correcting process and instructs the display unit 27 to display the 3D image having the corrected amount of parallax. Thereafter, the processing is completed.

However, if, in step S52, it is determined that a pixel having an amount of parallax outside the range from the minimum amount of parallax to the maximum amount of parallax, inclusively, is not present, the processing proceeds to step S55. In step S55, the shift processing unit 82 directly supplies, to the display unit 27, the image data of a 3D image supplied from the video decoder 26. Thus, only the 3D image is displayed on the display unit 27. Thereafter, the processing is completed.

Figure 10:
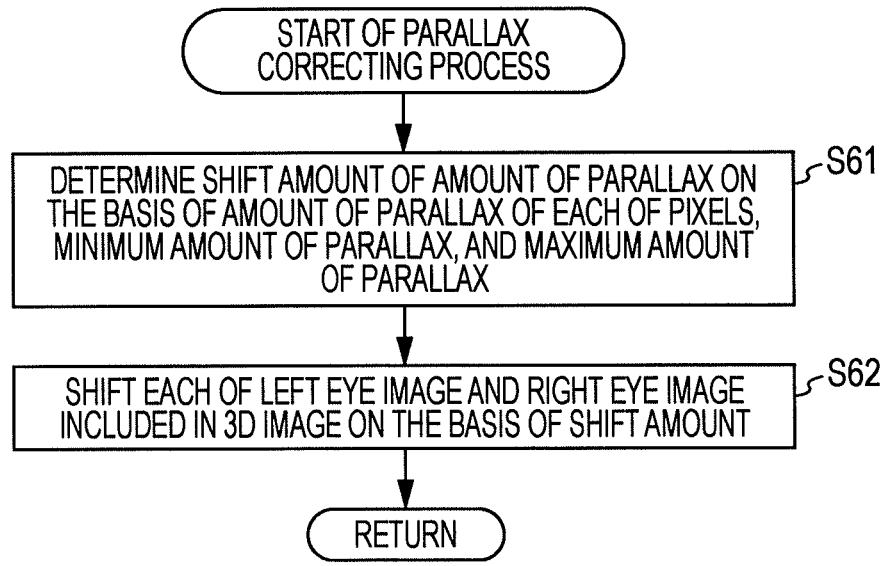
FIG. 10 is a flowchart illustrating the parallax correcting process illustrated in FIG. 9 in detail.

FIG. 10 is a flowchart illustrating the parallax correcting process performed in step S53 illustrated in FIG. 9.

In step S61 illustrated in FIG. 10, by using the amount of parallax of each of the pixels of the image data of the 3D image, the minimum amount of parallax, and the maximum amount of parallax, the parallax control unit 81 (refer to FIG. 8) of the parallax correcting unit 71 determines, as a parameter, a shift amount of the amount of parallax necessary for the amounts of parallax of all of the pixels to be within the estimated allowable range. The parallax control unit 81 supplies the determined shift amount to the shift processing unit 82.

In step S62, by using the shift amount supplied from the parallax control unit 81, the shift processing unit 82 shifts each of the left eye image and the right eye image included in a 3D image corresponding to the image data of the 3D image supplied from the video decoder 26 by half the shift amount in the horizontal direction. In this way, the amount of parallax of the image data of the 3D image is corrected by the shift amount. Thereafter, the processing returns to step S53 illustrated in FIG. 9 and, subsequently, the processing proceeds to step S54.

As described above, by using the estimated allowable range of the amount of parallax for the user, the parallax processing unit 31 illustrated in FIG. 7 corrects the amount of parallax so that the amounts of parallax of all of the pixels of the 3D image are within the estimated allowable range. Accordingly, a 3D image suitable for an individual user can be displayed.

Another Example of Detailed Configuration of Parallax Correcting Unit

Figure 11:
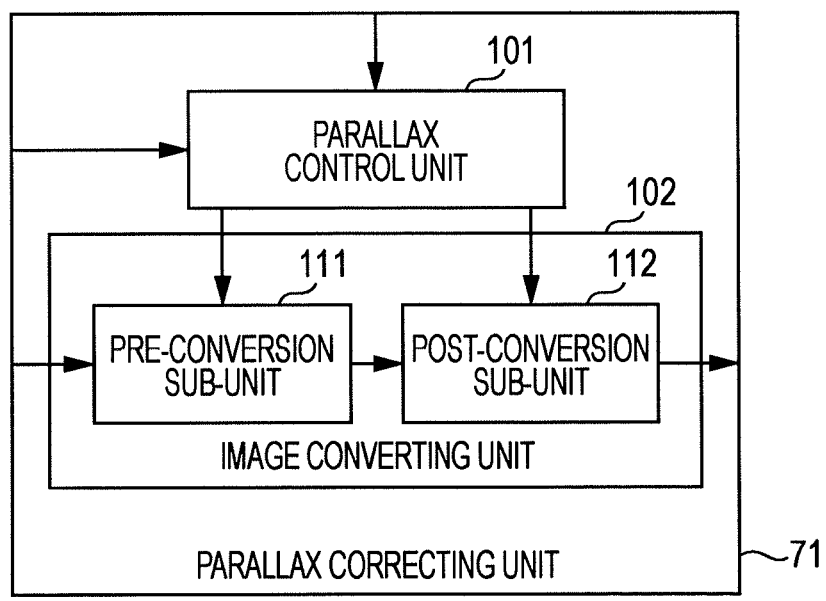
FIG. 11 is a block diagram of another example of the configuration of the parallax correcting unit illustrated in FIG. 7 in detail.

FIG. 11 is a block diagram of another example of the configuration of the parallax correcting unit 71 illustrated in FIG. 7 in detail.

As illustrated in FIG. 11, the parallax correcting unit 71 includes a parallax control unit 101 and an image converting unit 102. The parallax correcting unit 71 illustrated in FIG. 11 corrects the amount of parallax of a 3D image by shifting the amount of parallax of the 3D image so that the amounts of parallax of all of the pixels of the 3D image are within the estimated allowable range and scaling the 3D image.

More specifically, like the parallax control unit 81 illustrated in FIG. 8, the parallax control unit 101 reads the minimum amount of parallax and the maximum amount of parallax from the memory 30. Thereafter, like the parallax control unit 81, the parallax control unit 101 determines, on the basis of the amount of parallax of each of the pixels of the image data of a 3D image detected by the parallax detecting unit 51, the minimum amount of parallax, and the maximum amount of parallax, whether a pixel having an amount of parallax that is not within the estimated allowable range is present. If it is determined that a pixel having an amount of parallax that is not within the estimated allowable range is present, the parallax control unit 101 determines, as parameters, a shift amount of the amount of parallax and a scaling factor necessary for the amounts of parallax of all of the pixels to be within the estimated allowable range.

More specifically, first, the parallax control unit 101 determines a scaling factor r and offset amounts $(x_{Li}, y_{Li})$ and $(x_{Ri}, y_{Ri})$ (i=0, 1) necessary for the amount of parallax of the corrected 3D image to be within the estimated allowable range using the following equation (1):

$$\begin{pmatrix} x''_L & x''_R \\ y''_L & y''_R \end{pmatrix} = \begin{pmatrix} r & 0 \\ 0 & 1 \end{pmatrix} \begin{pmatrix} x_L - x_{L0} & x_R - x_{R0} \\ y_L & y_R \end{pmatrix} + \begin{pmatrix} x_{L1} & x_{R1} \\ 0 & 0 \end{pmatrix} \quad (1)$$

where $x''_L, y''_L, x''_R,$ and $y''_R$ denote the position of a pixel for the left eye of the corrected 3D image in the horizontal direction, the position of the pixel in the vertical direction, the position of a pixel for the right eye of the corrected 3D image in the horizontal direction, and the position of the pixel in the vertical direction, respectively, and $x_L, y_L, x_R,$ and $y_R$ denote the position of a pixel for the left eye of the uncorrected 3D image in the horizontal direction, the position of the pixel in the vertical direction, the position of a pixel for the right eye of the uncorrected 3D image in the horizontal direction, and the position of the pixel in the vertical direction, respectively.

Subsequently, in order to obtain a shift amount S, the parallax control unit 101 splits equation (1) into the following equations (2) and (3):

$$\begin{pmatrix} x'_L & x'_R \\ y'_L & y'_R \end{pmatrix} = \begin{pmatrix} x_L - \frac{S}{2} & x_R + \frac{S}{2} \\ y_L & y_R \end{pmatrix} \quad (2)$$

$$\begin{pmatrix} x''_L & x''_R \\ y''_L & y''_R \end{pmatrix} = \begin{pmatrix} r & 0 \\ 0 & 1 \end{pmatrix} \begin{pmatrix} x'_L - x_{LC} & x'_R - x_{RC} \\ y_L & y_R \end{pmatrix} + \begin{pmatrix} x_{LC} & x_{RC} \\ 0 & 0 \end{pmatrix} \quad (3)$$

In equations (2) and (3), $x'_L, y'_L, x'_R,$ and $y'_R$ denote the position of a pixel for the left eye of the shifted 3D image in the horizontal direction, the position of the pixel in the vertical direction, the position of a pixel for the right eye of the corrected 3D image in the horizontal direction, and the position of the pixel in the vertical direction, respectively. In addition, in equation (3), $x_{LC}$ denotes the position of the center of the shifted left eye image in the horizontal direction, and $x_{RC}$ denotes the position of the center of the shifted right eye image in the horizontal direction. The parallax control unit 101 supplies the obtained shift amount S and the scaling factor r to the image converting unit 102.

The image converting unit 102 includes a pre-conversion sub-unit 111 and a post-conversion sub-unit 112.

The image data of the 3D image supplied from the video decoder 26 is input to the pre-conversion sub-unit 111. Like the shift processing unit 82 illustrated in FIG. 8, the pre-conversion sub-unit 111 shifts each of the left eye image and the right eye image included in a 3D image corresponding to the image data of the input 3D image in the horizontal direction using the shift amount S supplied from the parallax control unit 101 and equation (2) described above. Thereafter, the pre-conversion sub-unit 111 supplies the image data of the shifted 3D image to the post-conversion sub-unit 112.

By using the scaling factor supplied from the parallax control unit 101 and equation (3) described above, the post-conversion sub-unit 112 scales the entirety of the screen of the left eye image and the right eye image corresponding to the image data of the 3D image supplied from the pre-conversion sub-unit 111 with respect to the center of the image in the horizontal direction. The post-conversion sub-unit 112 supplies the image data of the scaled 3D image to the display unit 27 (refer to FIG. 2). Thus, the 3D image having a corrected amount of parallax is displayed on the display unit 27.

As described above, the parallax correcting unit 71 illustrated in FIG. 11 can scale the amount of parallax of a 3D image. Therefore, the stereoscopic effect of the corrected 3D image can be made more natural.

While the present embodiment has been described with reference to splitting of conversion indicated by equation (1) into two-stage conversion indicated by equations (2) and (3), the conversion indicated by equation (2) may be replaced by conversion in which the entirety of the screen including the left eye image and the right eye image is scaled in the horizontal direction with respect to the edge of the image. In this case, the parallax control unit 101 determines two scaling factors, supplies one of the scaling factors to the pre-conversion sub-unit 111, and supplies the other scaling factor to the post-conversion sub-unit 112. Thereafter, the pre-conversion sub-unit 111 scales the entirety of the screen including the left eye image and the right eye image corresponding to the input 3D image with respect to the edge of the image in the horizontal direction.

Description of Parallax Control

Figure 12:
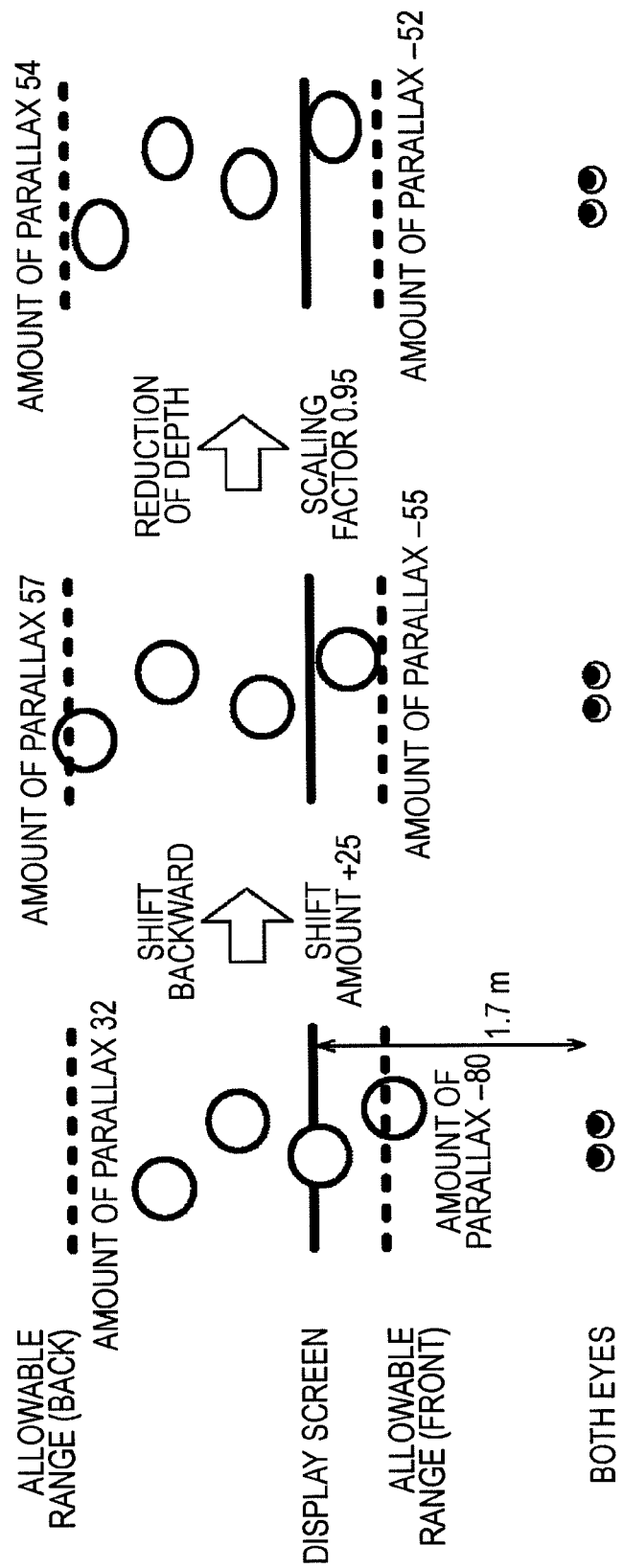
FIG. 12 illustrates an example of parallax control.

FIG. 12 illustrates an example of parallax control performed by the parallax control unit 101 illustrated in FIG. 11.

In the example illustrated in FIG. 12, the minimum amount of parallax is −56 pixels, and the maximum amount of parallax is +55 pixels.

When, as illustrated in FIG. 12, the minimum value of the amount of parallax of a 3D image detected by the parallax detecting unit 51 (refer to FIG. 7) is −80 pixels and the maximum value is +32 pixels, the parallax control unit 101 determines the shift amount S as, for example, +25 pixels. Accordingly, the minimum value of the amount of parallax of the shifted 3D image is changed to −55 pixels and the minimum value of the amount of parallax of the shifted 3D image is changed to 57 pixels.

In such a case, the maximum value of the amount of parallax of the shifted 3D image is slightly greater than the maximum amount of parallax. Accordingly, the parallax control unit 101 sets the scaling factor r to a value less than 1, for example, 0.95. In this way, the minimum value of the amount of parallax of the scaled 3D image is −52 pixels and the maximum value of the amount of parallax of the scaled 3D image is 54 pixels. Thus, the amount of parallax of the scaled 3D image is within a range from the minimum amount of parallax to the maximum amount of parallax, inclusively.

Description of Third Parallax Processing

The parallax processing performed by the parallax processing unit 31 illustrated in FIG. 7 including the parallax correcting unit 71 illustrated in FIG. 11 is similar to the parallax processing illustrated in FIG. 9 except for the parallax correction process performed in step S53 illustrated in FIG. 9. Accordingly, the parallax correction process performed by the parallax correcting unit 71 illustrated in FIG. 11 is described below with reference to FIG. 13.

Figure 13:
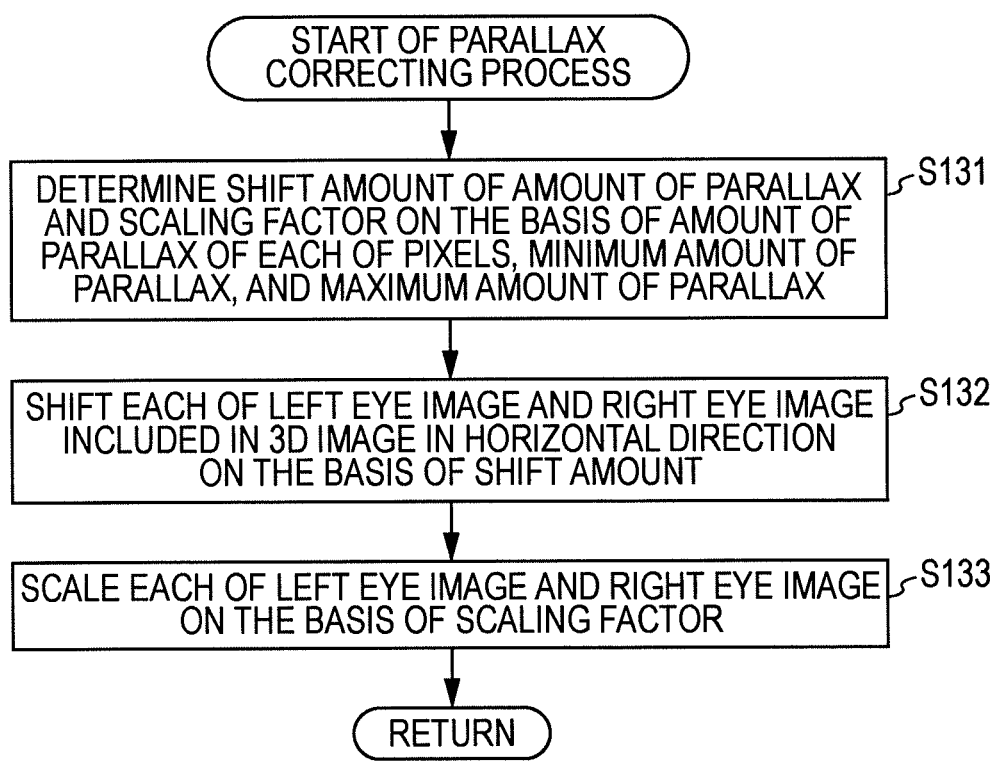
FIG. 13 is a flowchart illustrating the parallax correction process performed by the parallax correcting unit illustrated in FIG. 11.

As illustrated in FIG. 13, in step S131, by using the amount of parallax of each of the pixels of the image data of the 3D image, the minimum amount of parallax, the maximum amount of parallax, and equations (1) to (3) described above, the parallax control unit 101 of the parallax correcting unit 71 illustrated in FIG. 11 determines the shift amount of the amount of parallax and the scaling factor necessary for the amounts of parallax of all of the pixels to be within the estimated allowable range. The parallax control unit 101 supplies the shift amount and the scaling factor to the image converting unit 102.

In step S132, by using the shift amount supplied from the parallax control unit 101 and equation (2) described above, the pre-conversion sub-unit 111 of the image converting unit 102 shifts each of the left eye image and the right eye image included in a 3D image corresponding to the image data of the input 3D image supplied from the video decoder 26 in the horizontal direction. Thereafter, the pre-conversion sub-unit 111 supplies the image data of the shifted 3D image to the post-conversion sub-unit 112.

In step S133, by using the scaling factor supplied from the parallax control unit 101 and equation (3) described above, the post-conversion sub-unit 112 scales the entirety of the screen of the left eye image and the right eye image corresponding to the image data of the 3D image supplied from the pre-conversion sub-unit 111 with respect to the center of the image in the horizontal direction. Thereafter, the processing returns to step S53 in FIG. 9 and, subsequently, the processing proceeds to step S54.

Note that instead of determining the parameter for correcting the amount of parallax so that the amounts of parallax of all of the pixels of the corrected 3D image are within the estimated allowable range, the parameter may be determined so that the amount of parallax of a predetermined pixel is within the estimated allowable range. Examples of the amount of parallax of a predetermined pixel include the amount of parallax of an area including a primary subject and the amount of parallax having a maximum frequency in the histogram of the amounts of parallax of all the pixels.

Description of Computer According to Embodiment

The above-described series of processes can be executed not only by hardware but also by software. When the above-described series of processes are executed by software, the programs of the software are installed in, for example, a general-purpose computer.

FIG. 14 illustrates an exemplary configuration of a computer having a program that executes the above-described series of processes installed therein according to an embodiment.

The program can be prestored in a storage unit 208 and a read only memory (ROM) 202 serving as recording media incorporated in the computer.

Alternatively, the program can be stored (recorded) in a removable medium 211. The removable medium 211 can be provided in the form of so-called package software. Examples of the removable medium 211 include a flexible disk, a compact disc read only memory (CD-ROM), a magneto-optical (MO) disk, a digital versatile disc (DVD), a magnetic disk, and a semiconductor memory.

Note that in addition to being installed from the removable medium 211 described above into the computer via a drive 210, the program can be downloaded from a communication network or a broadcast network into a computer and can be installed in the storage unit 208 incorporated in the computer. That is, the program can be wirelessly transferred from, for example, a download site via an artificial satellite for digital satellite broadcasting to the computer or can be downloaded via a network, such as a local area network (LAN) or the Internet, in a wired manner.

The computer includes a central processing unit (CPU) 201. An input/output interface 205 is connected to the CPU 201 via a bus 204.

When an instruction is input from, for example, a user operating an input unit 206 via the input/output interface 205, the CPU 201 executes the program stored in the ROM 202. Alternatively, the CPU 201 loads the program stored in the storage unit 208 into a random access memory (RAM) 203 and executes the program.

In this way, the CPU 201 performs the processes in accordance with the above-described flowcharts or the processes performed by the components in the above-described block diagrams. Thereafter, the CPU 201 outputs the result of processing from an output unit 207 via the input/output interface 205 or transmits the result from a communication unit 209 as necessary. Alternatively, the CPU 201 records the result into the storage unit 208 as necessary.

Note that the input unit 206 includes a keyboard, a mouse, and a microphone. The output unit 207 includes a liquid crystal display (LCD) and a speaker.

In the present specification, it is not necessary that the processes executed by the computer in accordance with the program be executed in the above-described sequence described in the flowcharts at all times. That is, the processes executed by the computer in accordance with the program may be executed in parallel or independently (e.g., parallel processing or processing based on objects).

In addition, the program may be executed by a single computer (processor) or may be distributedly executed by a plurality of computers. Furthermore, the program may be transferred to a remote computer and may be executed by the remote computer.

In addition, as used in the present specification, the term "system" refers to a combination of a plurality of devices.

In addition, it should be noted that embodiments of the present disclosure are not limited to the above-described embodiments. Various modifications can be made within the scope of the appended claims or the equivalents thereof.

The present disclosure contains subject matter related to that disclosed in Japanese Priority Patent Application JP 2010-235385 filed in the Japan Patent Office on Oct. 20, 2010, the entire contents of which are hereby incorporated by reference.

What is claimed is:

1. An image processing apparatus, comprising:
a first display control unit configured to cause a display unit to display a first 3D image;
a receiving unit configured to receive a message indicating whether an amount of parallax of the first 3D image being displayed on the display unit is within an allowable range at which a user can comfortably view the first 3D image;
a determining unit configured to determine a maximum allowable parallax and a minimum allowable parallax corresponding to the allowable range by:
increasing the amount of parallax by a predetermined amount until the amount of parallax reaches a first value at which the message indicates that the amount of parallax is not within the allowable range;
setting the maximum allowable parallax as the first value decreased by the predetermined amount;
decreasing the amount of parallax by the predetermined amount until the amount of parallax reaches a second value at which the message indicates that the amount of parallax is not within the allowable range; and
setting the minimum allowable parallax as the second value increased by the predetermined amount; and a second display control unit configured to cause the display unit to display a second 3D image on the basis of the estimated allowable range.

2. The image processing apparatus according to claim 1, wherein the determining unit includes:
a modifying unit configured to increase or decrease the amount of parallax of the first 3D image to be displayed on the display unit.

3. The image processing apparatus according to claim 1, wherein if the amount of parallax of the second 3D image is not within the allowable range, the second display control unit overlays a warning image on the second 3D image and causes the display unit to display the overlaid image.

4. The image processing apparatus according to claim 1, further comprising:
a parallax amount correcting unit configured to correct the amount of parallax of the second 3D image so that the amount of parallax of the second 3D image is within the allowable range,
wherein the second display control unit causes the display unit to display the second 3D image corrected by the parallax amount correcting unit.

5. The image processing apparatus according to claim 4, wherein the parallax amount correcting unit corrects the amount of parallax of the second 3D image by shifting a left eye image and a right eye image that constitute the second 3D image in the horizontal direction.

6. The image processing apparatus according to claim 4, wherein the parallax amount correcting unit corrects the amount of parallax of the second 3D image by shifting a left eye image and a right eye image that constitute the second 3D image in the horizontal direction and scaling the images.

7. An image processing method for use in an image processing apparatus, comprising:
causing a display unit to display a 3D image;
determining a maximum allowable parallax and a minimum allowable parallax corresponding to an allowable range at which a user can comfortably view the first 3D image by:
increasing an amount of parallax of the 3D image by a predetermined amount until the amount of parallax reaches a first value;
causing the display unit to display the 3D image on the basis of the first value;
receiving a first message indicating that the first value is not within the allowable range;
setting the maximum allowable parallax as the first value decreased by the predetermined amount;
decreasing the amount of parallax by the predetermined amount until the amount of parallax reaches a second value;
causing the display unit to display the 3D image on the basis of the second value;
receiving a second message indicating that the second is not within the allowable range; and
setting the minimum parallax value as the second value increased by the predetermined amount; and
causing the display unit to display the 3D image on the basis of the estimated allowable range.

8. A non-transitory computer-readable medium storing instructions, which when executed by a processor, cause a computer to perform processing comprising the steps of:
causing a display unit to display a 3D image;
determining a maximum allowable parallax and a minimum allowable parallax corresponding to an allowable range at which a user can comfortably view the first 3D image by:
increasing an amount of parallax of the 3D image by a predetermined amount until the amount of parallax reaches a first value;
causing the display unit to display the 3D image on the basis of the first value;
receiving a first message indicating that the first value is not within the allowable range;
setting the maximum allowable parallax as the first value decreased by the predetermined amount;
decreasing the amount of parallax by the predetermined amount until the amount of parallax reaches a second value;
causing the display unit to display the 3D image on the basis of the second value;
receiving a second message indicating that the second is not within the allowable range; and
setting the minimum parallax value as the second value increased by the predetermined amount; and
causing the display unit to display the 3D image on the basis of the estimated allowable range.

9. The image processing method of claim 7, wherein increasing the amount of parallax comprises:
repeatedly increasing the amount of parallax by the predetermined amount;
receiving the first message after each step of increasing the amount of parallax; and
stopping the increasing step when the amount of parallax is the first value.

10. The image processing method of claim 7, wherein decreasing the amount of parallax comprises:
repeatedly decreasing the amount of parallax by the predetermined amount;
receiving the second message after each step of decreasing the amount of parallax; and
stopping the decreasing step when the amount of parallax is the second value.

* * * * *